UNITED STATES PATENT OFFICE

JOHN W. CHURCH, OF CARNEGIE, PENNSYLVANIA, AND HARVEY G. ELLEDGE, OF PAINESVILLE, OHIO, ASSIGNORS TO PURE CALCIUM PRODUCTS COMPANY, OF PITTSBURGH, PENNSYLVANIA, A CORPORATION OF OHIO

METHOD OF MAKING BY-PRODUCT WHITING

No Drawing.   Application filed June 12, 1929.   Serial No. 370,456.

This invention relates to a method of making by-product whiting, ($CaCO_3$) which is substantially neutral even when in tne dry state.

The importance of eliminating the alkali from precipitated or by-product whiting is of great commercial significance, because heretofore, even when the whiting has been treated to change the surface conditions of its particles, such as by subjecting it to prolonged attrition in order to lower its oil absorption, the whiting has been somewhat limited in its uses. This has been due to the fact that where the whiting contains even a small percentage of alkali, the alkali is distinctly harmful to certain of the materials with which the whiting is used in making commercial plastics such as linseed oil paint, putty, and water paints. By our process the alkali is removed from the whiting so that its field of use is greatly increased.

Precipitated or by-product whiting as commonly known is formed as a by-product of the reaction of milk of lime on soda ash to form caustic soda. The reaction proceeds according to the following equation:

(1)   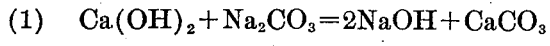
$Ca(OH)_2 + Na_2CO_3 = 2NaOH + CaCO_3$

The sodium hydroxide, which is the desired material, is then separated from the calcium carbonate.

The calcium carbonate is the by-product whiting. It contains a number of impurities which are present in the milk of lime and which are practically unaltered in the formation of the sodium hydroxide. There is also present a small percentage of alkali either in the form of calcium hydroxide, sodium hydroxide or sodium carbonate.

It has heretofore been attempted to treat this by-product whiting in several ways in order to neutralize these alkalis. The following two methods have been employed:

First, the impure calcium carbonate has been further treated with sodium carbonate to cause complete reaction of the calcium hydroxide. When this treatment is used and the lime alkalinity is reduced by treating with sodium carbonate, some caustic soda is formed and some sodium carbonate is left in the solution. Both of these compounds are alkaline. It was then attempted to wash out these alkaline impurities, but this could not be accomplished within practical limits, because calcium carbonate has a strong tendency to adsorb both caustic soda and sodium carbonate on the surface of its particles. This process accordingly has been found to be undesirable for the reason that it is impractical from a commercial standpoint to wash out the alkali from calcium carbonate.

According to another method heretofore practiced, the calcium carbonate slurry in a fairly large quantity of water was treated with carbon dioxide gas, the carbon dioxide reacting with the calcium hydroxide to form calcium carbonate, and also reacting with sodium carbonate to form sodium bicarbonate. When this treatment has been resorted to, although the material in the wet state showed neutral to phenolphthalein and was therefore non-alkaline, still it was alkaline to methyl orange, and the material when dried would again become alkaline to phenolphthalein due to driving off the carbon dioxide from the sodium bicarbonate which left sodium carbonate, a relatively strong alkali.

We have found that we can produce by-product whiting which is substantially neutral to phenolphthalein even after the whiting has been dried by heating it up to a temperature of 400° F. We accomplish this by first treating with carbon dioxide the calcium carbonate slurry, from which most of the sodium hydroxide has been separated in the process of making sodium hydroxide, but which still contains a small amount of sodium hydroxide and may contain a small amount of calcium hydroxide and sodium carbonate. This converts the free lime into calcium carbonate and the sodium alkali either to sodium carbonate or sodium bicarbonate. The resulting solution is very weak in either sodium carbonate or sodium bicarbonate and it is very difficult to control the carbon dioxide treatment so that a definite stop is made after converting the sodium hydroxide to sodium carbonate in order that no sodium bicarbonate will be formed. Also it is difficult and uneconomical to continue the treatment until no sodium carbonate remains and the only soda present is that in the form of bicarbonate. In practice, enough carbon dioxide is added to convert all the sodium hydroxide to sodium carbonate and some of the sodium carbonate to sodium bicarbonate so that there is a mixture of calcium carbonate, sodium carbonate, and sodium bicarbonate. The slurry is thereafter treated with a material which reacts with the sodium carbonate or sodium bicarbonate to convert it into a salt which can be washed out easily from the calcium carbonate. As materials which can be used for converting the sodium carbonate and sodium bicarbonate into a salt which can be easily washed out from the calcium carbonate, we may use an alkaline earth chloride such as calcium chloride, barium chloride, or magnesium chloride. The preferred material is calcium chloride as it is relatively inexpensive and has as one of its most available sources alkali plant ammonia still waste. It is also the preferred material because the solid phase of the resultant reaction is calcium carbonate, the material being produced, and, therefore, eliminates a contamination that would be entailed by the use of other alkaline earth chlorides. The treatment with calcium chloride, for example, converts the sodium carbonate and sodium bicarbonate into sodium chloride according to the following equations:

(2) $Na_2CO_3 + CaCl_2 = CaCO_3 + 2NaCl$
(3) $2NaHCO_3 + CaCl_2 = CaCO_3 + 2NaCl + CO_2 + H_2O$

Reactions (2) and (3) proceed quantitatively from left to right in accord with the well known principles of the law of mass action, because the low solubility of calcium carbonate in water, which in effect removes it from the reaction system, permits the reaction to proceed to completion. The alkali carbonates and bicarbonates which we eliminate by treatment with calcium chloride, for example, are already soluble, but although soluble, they are strongly absorbed on the contacting solution films which envelop the calcium carbonate particles. When the contacting film of a solution enveloping the surface of a particle shows a higher or lower concentration of the solute than obtains throughout the remaining solution, the phenomenon is called adsorption. The solute is said to be adsorbed by the solid. When the contacting film shows a greater concentration of the solute, the adsorption is said to be positive, when less, negative adsorption. Finely divided calcium carbonate has a relatively high positive adsorption or affinity for sodium carbonate and sodium bicarbonate, but has a relatively low positive adsorption or affinity for sodium chloride. Thus, by changing the adsorbed solutes by the chemical method explained above, (reactions (2) and (3), from that of high adsorption to one of low adsorption, purification of the calcium carbonate by washing is facilitated, because a substance of high adsorption is difficult to remove by washing while one of low adsorption is readily removed by washing.

The amount of calcium chloride preferably employed is slightly in excess of the amount necessary to convert all of the sodium alkali into sodium chloride. The material is then washed to wash out the sodium chloride, dried, disintegrated and subjected to attrition. The drying temperature is preferably not over 400° F.

As a specific example of the manner in which our process may be carried out, we first form a slurry by adding water to the impure calcium carbonate from which the major portion of the sodium hydroxide has been separated. The slurry is then saturated with carbon dioxide gas which converts the free lime into calcium carbonate, and the sodium alkali into sodium carbonate or sodium bicarbonate. After the slurry has been saturated with carbon dioxide gas, a solution of calcium chloride is added in quantities slightly in excess of the amount necessary to convert all of the sodium carbonate or sodium bicarbonate or both into sodium chloride. The material is filtered and washed with water to eliminate the sodium chloride. It is then dried at a temperature not exceeding 400° F. and is thereafter disintegrated and subjected to attrition. The attriting step may be carried out in any desired apparatus such as a ball mill and the attriting is continued for a period of time sufficient to change the surface conditions of the particles of the whiting so that its oil absorption value is reduced to not more than 25 cc. per 100 grams.

The product so produced is a dry powder particularly adapted for use in commercial plastics such as rubber, linseed oil paint, putty, and water paints where glue is employed. It is substantially neutral to phenolphthalein even after drying at a temperature up to 400° F.

We have described in detail the present preferred method of practicing our invention. It is to be understood, however, that the process may be modified within the scope of the following claims.

We claim:
1. The process of neutralizing alkali in by-product whiting which has been formed by the reaction of calcium hydroxide with sodium carbonate, which comprises treating a slurry of the whiting with carbon dioxide to convert the free lime to calcium carbonate and the sodium alkali to a salt containing sodium and carbonate radicals, then treating the slurry with an alkaline earth chloride which converts the sodium salt into sodium chloride, and washing out the sodium chloride.

2. The process of neutralizing alkali in by-product whiting which has been formed by the reaction of calcium hydroxide with sodium carbonate, which comprises treating a slurry of the whiting with carbon dioxide to convert the free lime to calcium carbonate and the sodium alkali to a salt containing sodium and carbonate radicals, treating the slurry with calcium chloride to convert the sodium salt to sodium chloride and form calcium carbonate, and washing out the sodium chloride.

3. In the process of treating by-product whiting containing free alkali, the steps comprising forming a slurry of the whiting, treating the slurry with carbon dioxide to convert the alkali into a salt containing alkali metal and carbonate radicals, adding calcium chloride to form alkali metal chloride, and washing out the alkali metal chloride.

4. The process of producing whiting, comprising reacting calcium hydroxide and sodium carbonate to form sodium hydroxide and calcium carbonate containing impurities, separating the major portion of the sodium hydroxide, forming a slurry of the impure calcium carbonate, treating the slurry with carbon dioxide to convert the remaining sodium hydroxide into a salt containing sodium and carbonate radicals, treating the slurry with an alkaline earth chloride to convert the salt into sodium chloride, and washing out the sodium chloride.

5. The process of producing whiting, comprising reacting calcium hydroxide and sodium carbonate to form sodium hydroxide and calcium carbonate containing impurities, separating the major portion of the sodium hydroxide, forming a slurry of the impure calcium carbonate, treating the slurry with carbon dioxide to convert the remaining sodium hydroxide into a salt containing sodium and carbonate radicals, treating the slurry with calcium chloride to convert the salt into sodium chloride, and washing out the sodium chloride.

In testimony whereof I have hereunto set my hand.

JOHN W. CHURCH.

In testimony whereof I have hereunto set my hand.

HARVEY G. ELLEDGE.